United States Patent
Yu et al.

(10) Patent No.: US 7,742,391 B2
(45) Date of Patent: Jun. 22, 2010

(54) APPARATUS AND METHOD FOR ESTIMATING FREQUENCY OFFSET

(75) Inventors: Chang-Wahn Yu, Daejeon (KR); Youn-Ok Park, Daejeon (KR)

(73) Assignees: Samsung Electronics Co., Ltd. (KR); Electronics and Telecommunications Research Institute (KR); Hanaro Telecom., Inc. (KR); SK Telecom Co., Ltd. (KR); KT Corporation (KR)

( * ) Notice: Subject to any disclaimer, the term of this patent is extended or adjusted under 35 U.S.C. 154(b) by 812 days.

(21) Appl. No.: 11/636,809

(22) Filed: Dec. 11, 2006

(65) Prior Publication Data

US 2007/0147225 A1    Jun. 28, 2007

(30) Foreign Application Priority Data

Dec. 10, 2005 (KR) ............... 10-2005-0121358

(51) Int. Cl.
*H04J 11/00* (2006.01)
(52) U.S. Cl. .............. 370/208; 370/210; 370/206
(58) Field of Classification Search ............ 370/203, 370/208, 210
See application file for complete search history.

(56) References Cited

U.S. PATENT DOCUMENTS

| 6,704,374 B1 | 3/2004 | Belotserkovsky et al. |
| 2004/0141457 A1* | 7/2004 | Seo et al. .................. 370/203 |
| 2008/0043858 A1* | 2/2008 | Lim et al. .................. 375/260 |

FOREIGN PATENT DOCUMENTS

KR    10-2005-0034116    4/2005

* cited by examiner

*Primary Examiner*—Jason E Mattis
*Assistant Examiner*—Kibrom T Hailu
(74) *Attorney, Agent, or Firm*—The Farrell Law Firm, LLP

(57) ABSTRACT

In a frequency offset estimating device of a subscriber station of a communication system in which a plurality of sectors are allocated to a cell, the frequency offset estimating device extracts a preamble sequence from a downlink frame signal. The frequency offset estimating device estimates a phase offset of a sector to which the subscriber station belongs among the sectors by using the preamble sequence, and calculates the autocorrelation value for the respective signals of the preamble sequence. The frequency offset estimating device compensates the autocorrelation value by using the phase offset, and estimates a frequency offset from the sum of the phase offset compensated autocorrelation values.

13 Claims, 6 Drawing Sheets

APPARATUS AND METHOD FOR ESTIMATING FREQUENCY OFFSET

PRIORITY

This application claims priority under 35 U.S.C. §119 to a Korean application filed in the Korean Intellectual Property office on Dec. 10, 2005 and allocated Serial No. 10-2005-0121358, the contents of which are incorporated herein by reference.

BACKGROUND OF THE INVENTION (a) Field of the Invention

The present invention relates to a method and device for estimating a frequency offset in a communication system. More particularly, the present invention relates to a method and device for estimating a frequency offset in an orthogonal frequency division multiplexing access (OFDMA) system.

(b) Description of the Related Art

In a communication system using a plurality of orthogonal subcarriers such as the OFDMA system, interference between adjacent subcarriers are increased to substantially increase the bit error rate when the orthogonality is not maintained. The orthogonality in a downlink may be lost by the frequency offset that is generated when the frequencies between the carriers of a base station and a subscriber station are not synchronized. Therefore, methods for estimating the frequency offset have been proposed in order to compensate for the frequency offset.

One frequency offset estimating method is to use the characteristic in which a preamble is repeated in the time domain. The above-noted method is to estimate a start point by searching an interval in which preambles are repeated, correlate the repeated preambles, calculate a phase value, and estimate a frequency offset. However, the method is not applicable to the system that uses subcarriers having preambles that are used to identify cells and sectors and are different for respective sectors and that uses different codes. For example, an application of the above-noted method to the IEEE 802.16e based system may generate frequency offset estimation errors.

SUMMARY OF THE INVENTION

The present invention has been made in an effort to provide a method and device for estimating a frequency offset by compensating for a sector offset.

In one aspect of the present invention, in a method of estimating a frequency offset by a subscriber station of a communication system in which a plurality of sectors are allocated to a cell, the method includes: extracting a preamble sequence from a downlink frame signal; estimating a phase offset of a sector to which the subscriber station belongs from among the sectors by using the preamble sequence; calculating autocorrelation values for respective signals of the preamble sequence; compensating the autocorrelation values with the phase offset; and estimating a frequency offset from the sum of phase offset compensated autocorrelation values. Estimating of the phase offset includes: converting the preamble sequence into a preamble signal in the frequency domain; extracting subcarriers of respective sectors from the preamble signal; calculating sizes of subcarriers of the respective sectors; calculating received power of the respective sectors from the sizes of subcarriers of the sectors; comparing received power of the respective sectors and detecting a sector to which the subscriber station belongs from among the sectors; and determining the phase offset of the detected sector. The phase offset is determined by the number N of the preamble sequences, the index n of the signal of the preamble sequence in the time domain, and the number s of shifting of the detected sector with respect to the reference sector from among the sectors.

In another aspect of the present invention, in a device for estimating a frequency offset in a subscriber station of a communication system in which a plurality of sectors are allocated to a cell, the device includes: a receiver for receiving a downlink frame signal, and a frequency offset estimator for extracting a preamble sequence from the downlink frame signal, estimating a phase offset of a sector to which the subscriber station belongs by using the preamble sequence, and estimating a frequency offset by using the phase offset and the preamble sequence. The frequency offset estimator includes: a preamble sequence extractor for extracting the preamble sequence from the downlink frame signal; a sector detector for estimating a phase offset of a sector to which the subscriber station belongs by using the preamble sequence; an autocorrelation calculator for calculating an autocorrelation value for the signal of the preamble sequence; a phase offset compensator for compensating the autocorrelation value by using the phase offset; and a frequency offset calculator for estimating a frequency offset from the sum of the phase offset compensated autocorrelation values. The sector detector includes: a means for calculating received power of the sector from the subcarriers corresponding to the sectors of the preamble sequence; a means for comparing the received power of the respective sectors and detecting the sector to which the subscriber station belongs from among the sectors; and a means for determining the phase offset of the detected sector.

In another aspect of the present invention, provided is a recording medium recording a program for realizing a method for estimating a frequency offset in a communication system in which a plurality of sectors are allocated to a cell, wherein the method includes: extracting a preamble sequence from a downlink frame signal; estimating a phase offset of the sector to which the subscriber station belongs from among the sectors by using the preamble sequence; calculating an autocorrelation value for the respective signals of the preamble sequence; compensating the autocorrelation value by using the phase offset, and estimating a frequency offset from the phase offset compensated autocorrelation value.

DETAILED DESCRIPTION OF THE EMBODIMENTS

Figure 1:
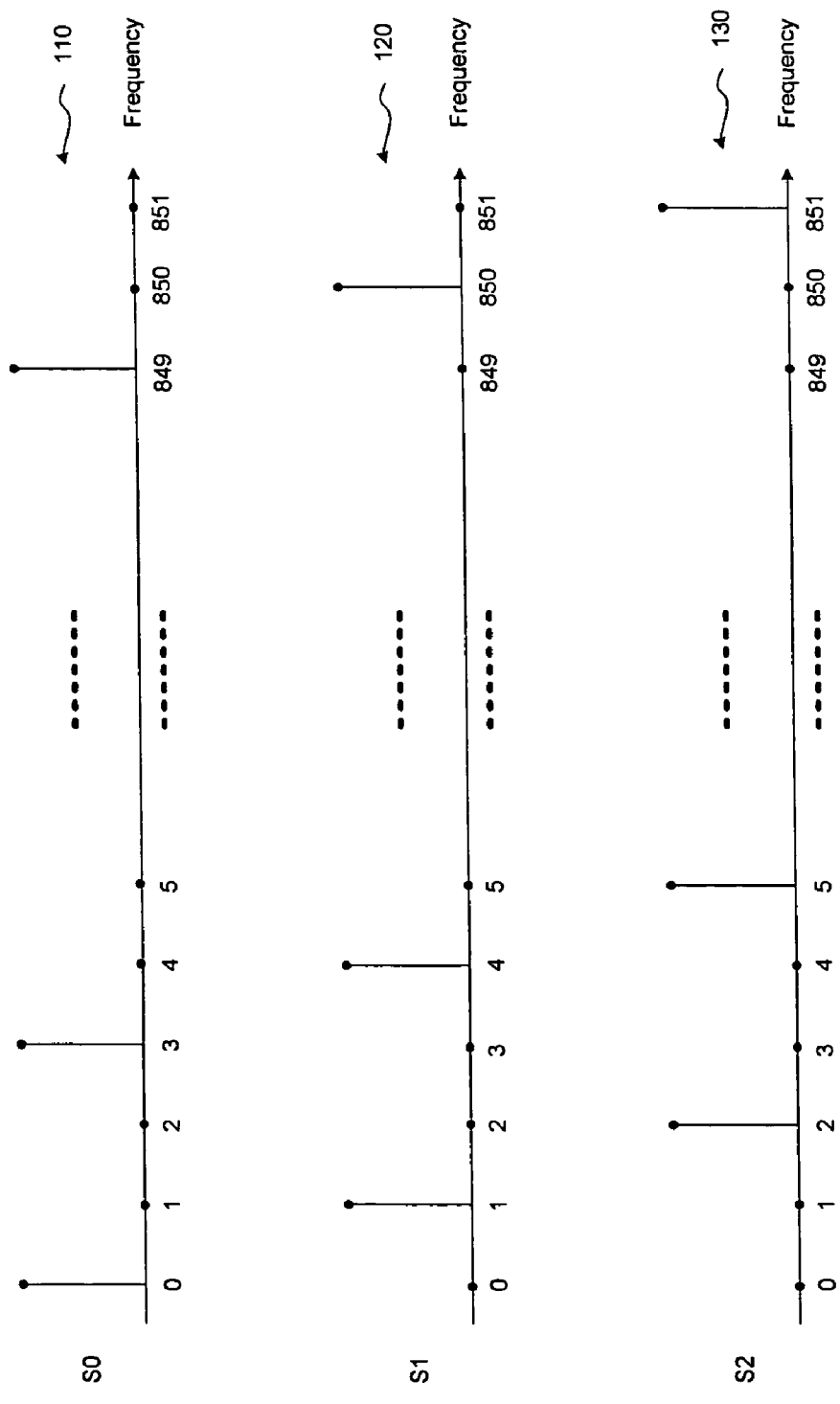
FIG. 1 shows a brief diagram for preamble signals for each sector in a communication system according to an embodiment of the present invention.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

The term of a block over the present specification represents a unit for processing a predetermined function or operation, which can be realized by hardware, software, or combination of hardware and software.

A method and device for estimating a frequency offset in a communication system according to an embodiment of the present invention will now be described with reference to drawings. An embodiment of the present invention described the communication system on the OFDMA system basis, and the embodiment of the present invention is applicable to other communication systems.

A preamble signal of the communication system according to an embodiment of the present invention will now be described with reference to FIG. 1 and FIG. 2.

Figure 2:
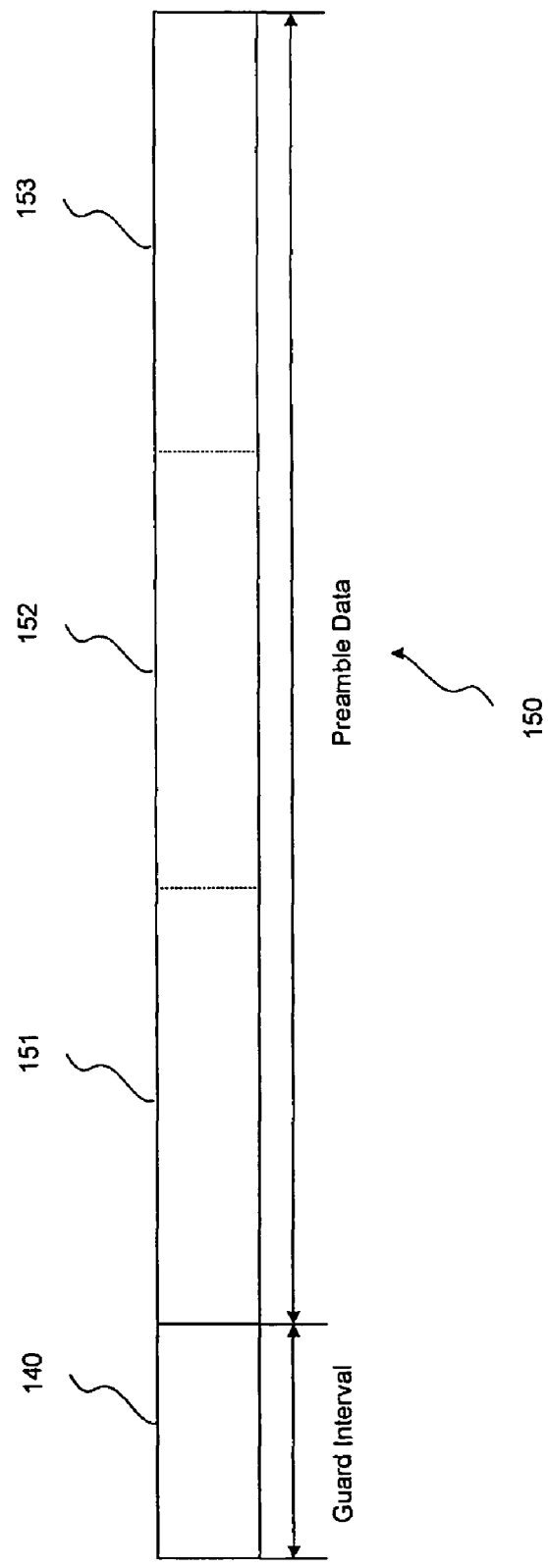
FIG. 2 shows a brief diagram for a frame structure corresponding to the time domain of a preamble signal corresponding to a sector of a predetermined cell shown in FIG. 1.

FIG. 1 shows a brief diagram for preamble signals for each sector in a communication system according to an embodiment of the present invention, and FIG. 2 shows a brief diagram for a frame structure corresponding to the time domain of a preamble signal corresponding to a sector of a predetermined cell shown in FIG. 1.

For ease of description, it is assumed in FIG. 1 and FIG. 2 that the number of sectors S0, S1, and S2 identifiable by a cell is given 3 and 852 subcarriers are used.

Referring to FIG. 1, preamble signals 110, 120, and 130 used for the respective sectors have 284 subcarriers, and use different subcarriers so as to identify the sectors. A corresponding sector preamble sequence is mapped for each group of three subcarriers in order for the signal per sector to have a repeated structure in the time domain. For example, a preamble sequence 110 is mapped on subcarriers having the remainder of 0 generated by dividing the subcarrier number by 3 in the sector 0 (S0), a preamble sequence 120 is mapped on subcarriers having the remainder of 1 generated by dividing the subcarrier number by 3 in the sector 1 (S1), and a preamble sequence 130 is mapped on subcarriers having the remainder of 2 generated by dividing the subcarrier number by 3 in the sector 2 (S2). In this instance, the preamble sequence can have the value of 1 or −1, and uses different sequences depending on the cell and the sector.

Referring to FIG. 2, the preamble signal 100 in the time domain includes a guard interval 140 and preamble data 150, and the preamble data have a structure having three repeated data 151, 152, and 153 according to the subcarrier allocation method described in FIG. 1.

A method and device for estimating a frequency offset by using the preamble signal by the subscriber station will now be described with reference to FIG. 3 to FIG. 6.

Figure 3:
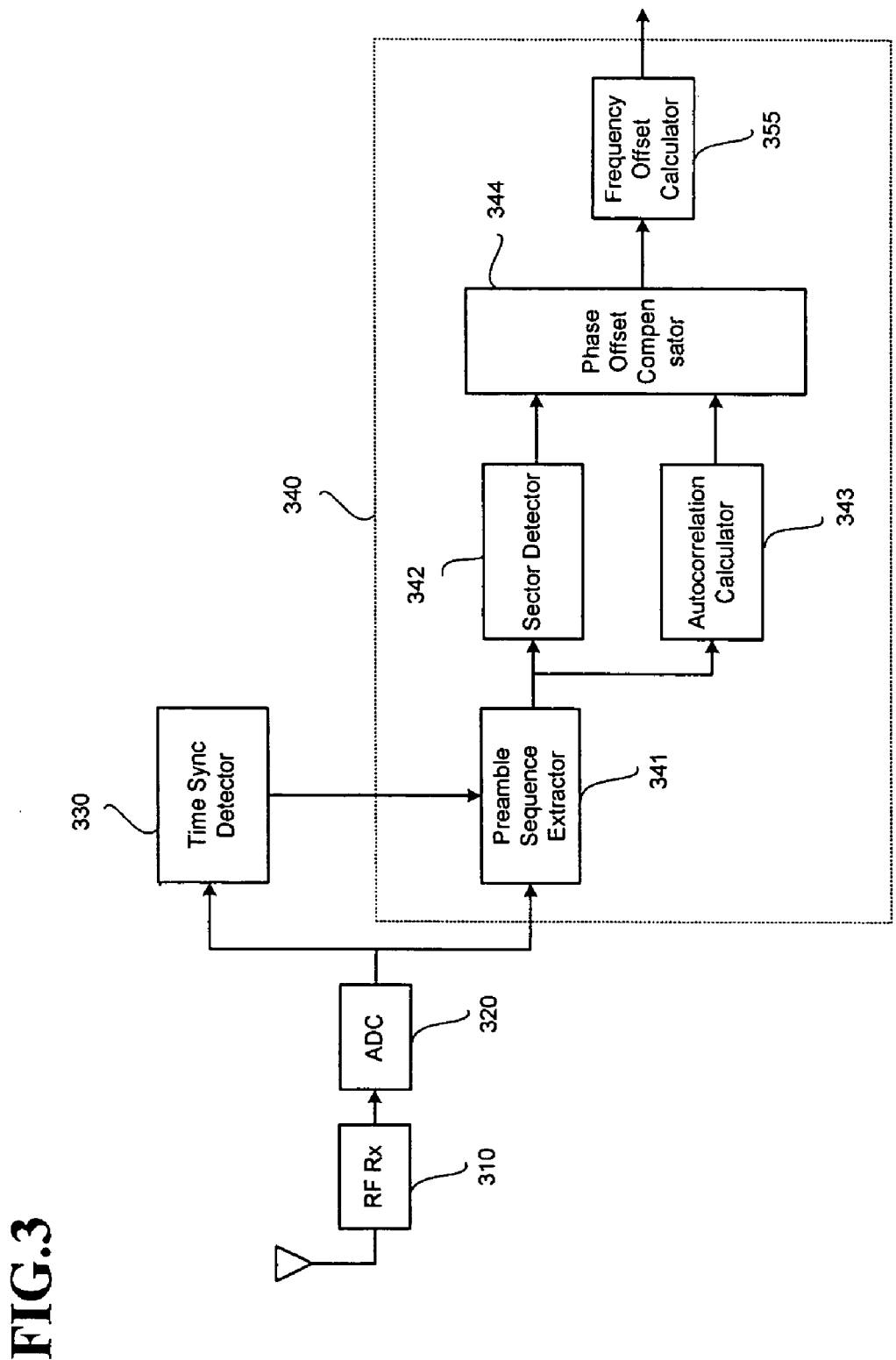
FIG. 3 shows a block diagram for a downlink receiver in a communication system according to an embodiment of the present invention.
Figure 4:
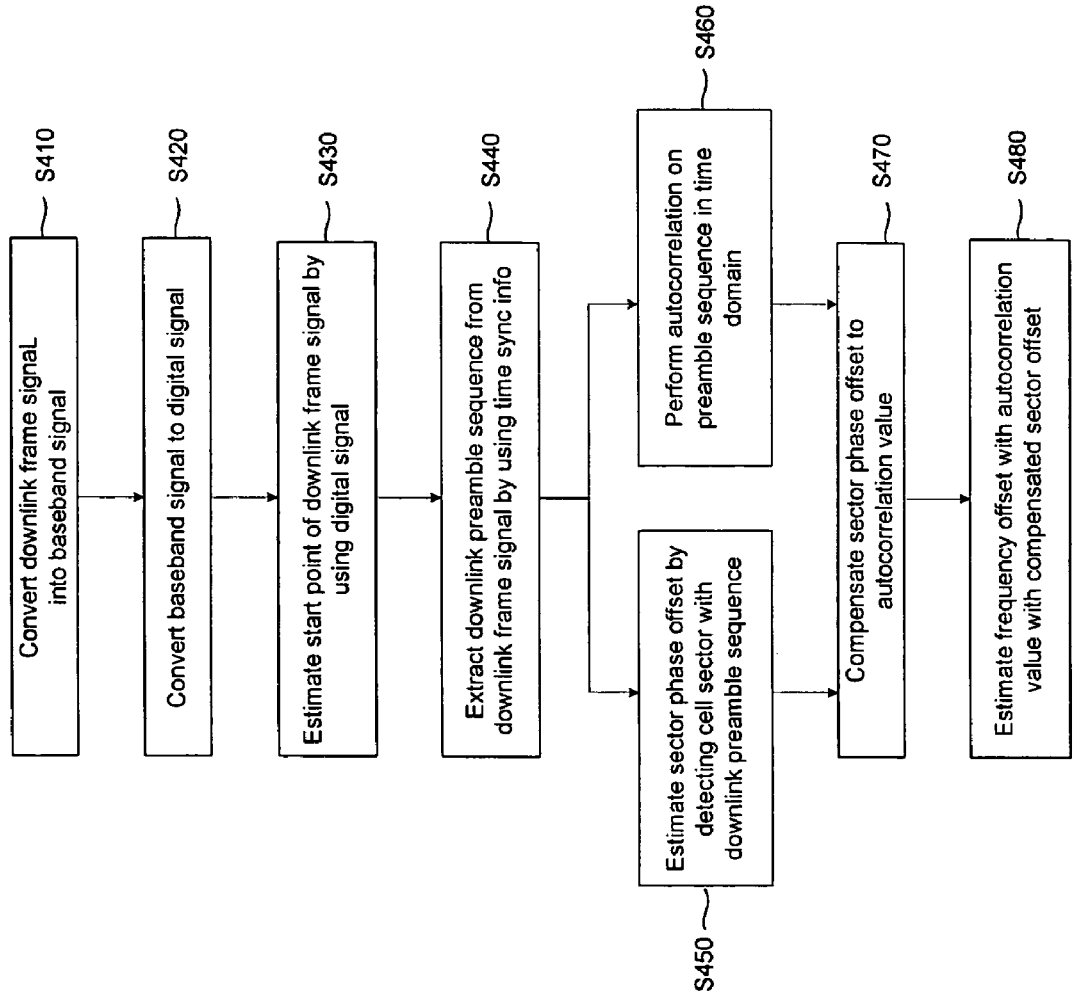
FIG. 4 shows a flowchart for a frequency offset estimation method according to an embodiment of the present invention.

FIG. 3 shows a block diagram for a downlink receiver in a communication system according to an embodiment of the present invention, and FIG. 4 shows a flowchart for a frequency offset estimation method according to an embodiment of the present invention.

As shown in FIG. 3, the downlink receiver includes a radio frequency (RF) receiver 310, an analog/digital (A/D) converter 320, a time synchronization detector 330, and a frequency offset estimator 340. The frequency offset estimator 340 includes a preamble sequence extractor 341, a sector detector 342, an autocorrelation calculator 343, a phase offset compensator 344, and a frequency offset calculator 345.

Referring to FIG. 4, the RF receiver 310 converts a downlink frame signal received from a downlink transmitter (not shown) through a radio channel into a baseband signal (S410), and the A/D converter 320 converts the converted baseband signal into a digital signal (S420). The time synchronization detector 330 estimates the start point of the downlink frame signal by using the digital signal (S430).

The preamble sequence extractor 341 of the frequency offset estimator 340 extracts a downlink preamble sequence from the downlink frame signal by using time synchronization information of the time synchronization detector 330 (S440). The sector detector 342 detects a sector of a corresponding cell to estimate a phase offset of the sector by using the extracted downlink preamble sequence (S450), and the autocorrelation calculator 343 performs autocorrelation on the preamble sequence in the time domain (S460). The phase offset compensator 344 compensates the sector phase offset of the autocorrelation value (S470), and the frequency offset calculator 345 the frequency offset by using the sector phase offset compensated autocorrelation value (S480).

In FIG. 3, the RF receiver 310, the A/D converter 320, the time synchronization detector 330, the preamble sequence extractor 341, the phase offset compensator 344, and the frequency offset calculator 345 will not be described since they can be easily realized by a person of an ordinary skill in the art. The sector detector 342 and the autocorrelation calculator 343 will now be described with reference to FIG. 5 and FIG. 6.

Figure 5:
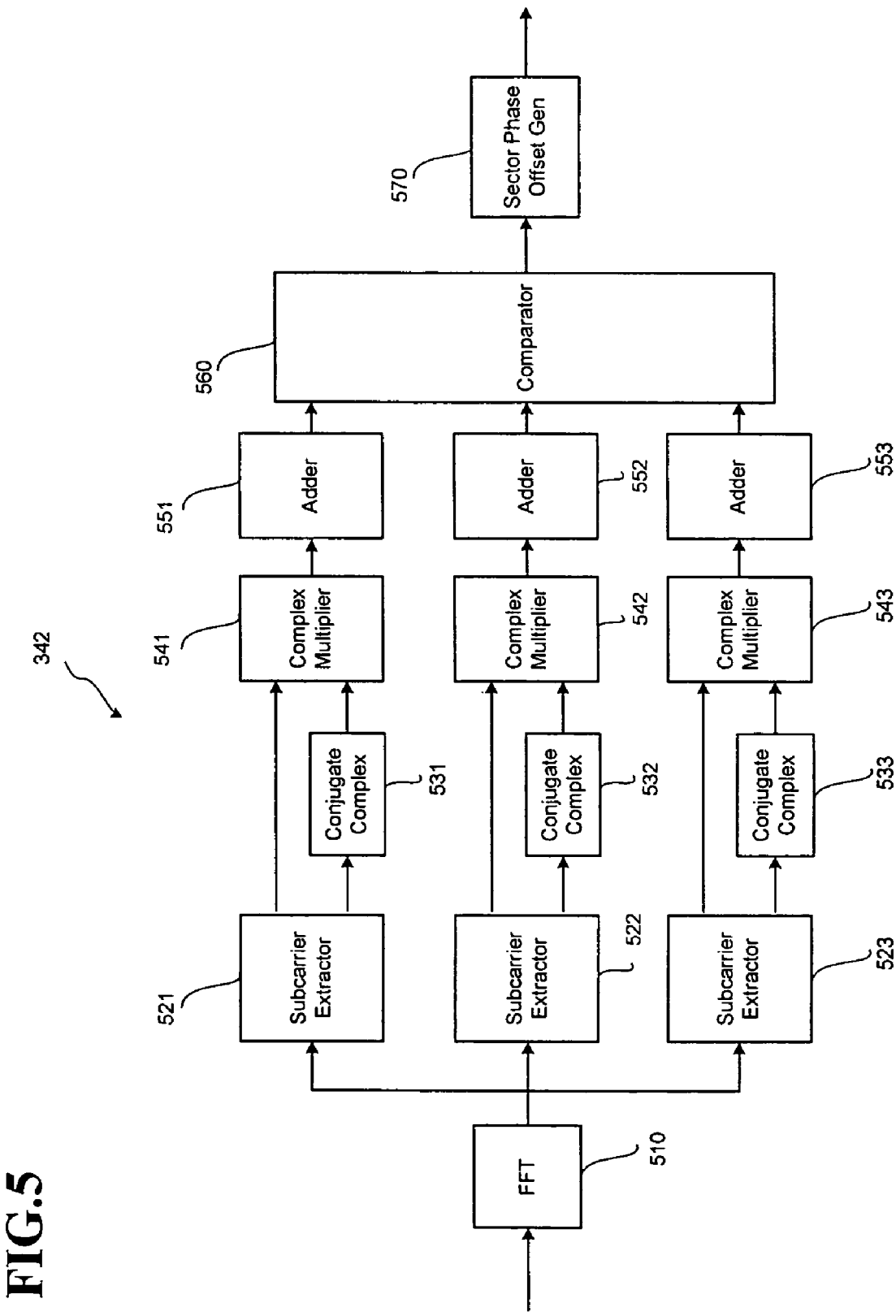
FIG. 5 shows a brief block diagram for a sector detector accord rig to an embodiment of the present invention.

FIG. 5 shows a brief block diagram for the sector detector 342 according to an embodiment of the present invention, and it is assumed in FIG. 5 that the number of sectors are given 3 for ease of description.

As shown in FIG. 5, the sector detector 342 includes a fast Fourier transform (FFT) unit 510, a plurality of sector subcarrier extractors 521, 522, and 523, a plurality of complex conjugate units 531, 532, and 533, a plurality of complex multipliers 541, 542, and 543, a plurality of adders 551, 552, and 553, a comparator 560, and a sector phase offset generator 570.

The fast Fourier transform (FFT) unit 510 converts the downlink preamble sequence extracted by the preamble sequence extractor 341 into a preamble signal in the frequency domain, and the respective sector subcarrier extractors 521, 522, and 523 extract a subcarrier of the corresponding sector from the preamble signal in the frequency domain. The respective complex conjugate units 531, 532, and 533 perform a conjugate operation on the subcarriers of the corresponding sectors extracted by the sector subcarrier extractors 521, 522, and 523, and the respective complex multipliers 541, 542, and 543 multiply the corresponding sectors' subcarriers and the conjugate operation performed subcarriers of the corresponding sectors to calculate the subcarriers of the corresponding sectors. The respective adders 550 add all the subcarriers of the corresponding sectors to calculate received power of the corresponding sectors. The comparator 560 compares received power of a plurality of sectors (S0, S1, S2 in FIG. 1) to detect the sector to which the subscriber station belongs. For example, the comparator 560 determines the sector that has the greatest received power from among a plurality of sectors' received power to be the sector to which the subscriber station belongs. The sector phase offset generator 570 determines a phase offset of the detected sector for the reference sector (e.g., S0 shown in FIG. 1).

In this instance, as described with reference to FIG. 1 and FIG. 2, the preamble subcarrier of the second sector S1 is shifted to the right by one subcarrier in the frequency domain with respect to the preamble subcarrier of the first sector S0, and the preamble subcarrier of the third sector S2 is shifted to the right by two subcarriers in the frequency domain with respect to the preamble subcarrier of the first sector S0. Therefore, the phase offset of each sector is determined by phase rotation in the time domain, and the phase rotation is expressed in Equation 1.

$$\exp\left(-j2\pi\frac{n \times s}{N}\right) \quad \text{(Equation 1)}$$

where, N is the number of sequences in the time domain used for the preamble, and n is the index in the time domain for each signal of the preamble sequence. s is the number of shifting with reference to the reference sector (e.g., S0 shown in FIG. 1), and for example, the second sector (S1 shown in FIG. 1) is 1, and the third sector (S2 shown in FIG. 1) is 2.

That is, assuming in FIG. 5 that the reference sector is S0 of FIG. 1, the phase offset is 0 when the sector detected by the sector detector is S0, the phase offset is $$\exp\left(-j2\pi\frac{n}{N}\right)$$

when the detected sector is S1, and the phase offset is $$\exp\left(-j2\pi\frac{2n}{N}\right)$$

when the detected sector is S2.

Figure 6:
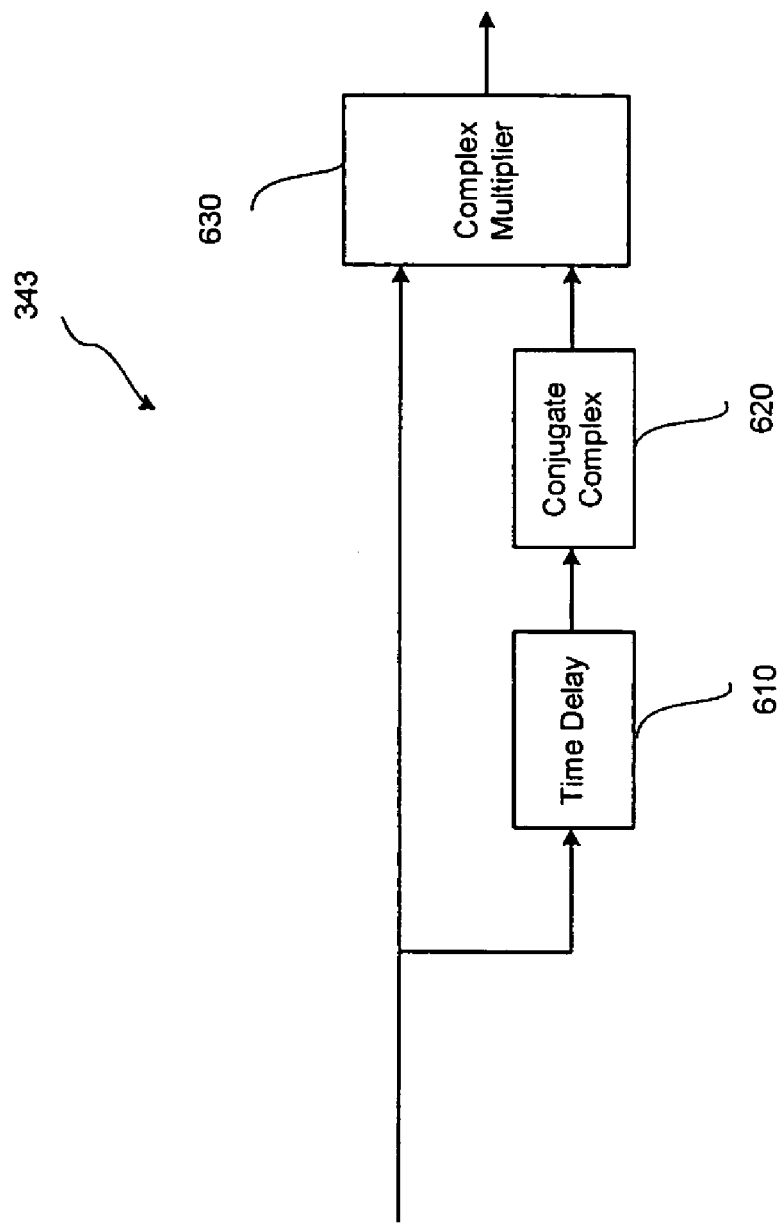
FIG. 6 shows a brief block diagram for an autocorrelation calculator according to an embodiment of the present invention.

FIG. 6 shows a brief block diagram for the autocorrelation calculator 343 according to an embodiment of the present invention.

As shown in FIG. 6, the autocorrelation calculator 343 includes a time delay unit 610, a complex conjugate unit 620, and a complex multiplier 630.

The time delay unit 610 delays each signal of the downlink preamble sequence extracted by the preamble sequence extractor 341 by the time difference between repeated signals, and the complex conjugate unit 620 performs a conjugate operation on each signal of the delayed preamble sequence. The complex multiplier 630 multiplies the signal of the preamble sequence and the delayed signal that is conjugate operation performed by the complex conjugate unit 620 to output an autocorrelation value.

Referring to FIG. 3, the phase offset compensator 344 multiplies the sector phase offset of the sector detector 342 and the autocorrelation value of the autocorrelation calculator 343 to compensate the sector phase offset for the autocorrelation value. For example, when the detected sector is S1, $$\exp\left(-j2\pi\frac{n}{N}\right)$$

is multiplied to the autocorrelation value of the n-th signal of the preamble sequence.

The frequency offset calculator 345 sums the sector phase offset compensated autocorrelation values, and estimates the frequency offset by using the summed values. That is, the value proportional to the sum of the sector phase offset compensated autocorrelation values is determined to be the frequency offset.

According to the embodiment of the present invention, the sector phase offset is compensated before the frequency offset is estimated, and hence, the frequency offset can be estimated in the system using subcarriers having preambles that are used to identify sectors and are different for respective sectors.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

The embodiment of the present invention is not only realized by the method and device, but also realized by a program for realizing functions corresponding to the configuration of the embodiment of the present invention or a medium having recorded the program, which can be easily realized by a person of an ordinary skill in the art.

What is claimed is:

1. A method of estimating a frequency offset by a subscriber station of a communication system in which a plurality of sectors are allocated to a cell, the method comprising:
    extracting a preamble sequence from a downlink frame signal;
    estimating a phase offset of a sector to which the subscriber station belongs from among the sectors by using the preamble sequence;
    calculating autocorrelation values for respective signals of the preamble sequence;
    compensating the autocorrelation values with the phase offset; and
    estimating a frequency offset from the sum of phase offset compensated autocorrelation values,
    wherein estimating of the phase offset comprises:
        converting the preamble sequence into a preamble signal in the frequency domain;
        extracting subcarriers of respective sectors from the preamble signal;
        calculating sizes of the subcarriers of the respective sectors;
        calculating received power of the respective sectors from the sizes of the subcarriers of the sectors;
        comparing received power of the respective sectors and detecting a sector to which the subscriber station belongs from among the sectors; and determining the phase offset of the detected sector, and wherein the phase offset is determined by:

$$\exp\left(-j2\pi\frac{n\times s}{N}\right),$$

where N indicates a number of preamble sequences, n indicates an index of the preamble sequence in a time domain, and s indicates a number for shifting of the detected sector with respect to the reference sector from among the sectors.

2. The method of claim 1, wherein calculating of the sizes of the subcarriers comprises:
performing a conjugate operation on the respective subcarriers, and
multiplying the respective subcarriers and the conjugate operation performed subcarriers, and calculating the sizes of the respective subcarriers.

3. The method of claim 1, wherein the compensation comprises multiplying autocorrelation values of respective signals of the preamble sequence by the phase offset of the respective signals.

4. The method of claim 3, wherein the estimation comprises:
summing the phase offset multiplied autocorrelation values for the signals of the preamble sequence, and
estimating the frequency offset from the summed value.

5. The method of claim 1, further comprising:
converting the downlink frame signal into a baseband signal;
converting the baseband signal into a digital signal; and
estimating a start point of the downlink frame signal from the digital signal.

6. The method of claim 1, wherein subcarriers of the preamble sequence of the sector are arranged at regular intervals in the frequency domain.

7. A device for estimating a frequency offset in a subscriber station of a communication system in which a plurality of sectors are allocated to a cell, the device comprising:
a receiver for receiving a downlink frame signal, and
a frequency offset estimator for extracting a preamble sequence from the downlink frame signal, estimating a phase offset of a sector to which the subscriber station belongs by using the preamble sequence, and estimating a frequency offset by using the phase offset and the preamble sequence,
wherein the frequency offset estimator comprises:
a preamble sequence extractor for extracting the preamble sequence from the downlink frame signal;
a sector detector for estimating a phase offset of a sector to which the subscriber station belongs by using the preamble sequence;
an autocorrelation calculator for calculating an autocorrelation value for the signal of the preamble sequence;
a phase offset compensator for compensating the autocorrelation value by using the phase offset; and
a frequency offset calculator for estimating a frequency offset from the sum of the phase offset compensated autocorrelation values, and
wherein the phase offset is determined by:

$$\exp\left(-j2\pi\frac{n\times s}{N}\right),$$

where N indicates a number of preamble sequences, n indicates an index of the preamble sequence in a time domain, and s indicates a number for shifting of the detected sector with respect to the reference sector from among the sectors.

8. The device of claim 7, wherein the sector detector comprises:
a means for calculating received power of the sector from the subcarriers corresponding to the sectors of the preamble sequence;
a means for comparing the received power of the respective sectors and detecting the sector to which the subscriber station belongs from among the sectors; and
a means for determining the phase offset of the detected sector.

9. The device of claim 7, wherein the means for calculating calculates the received power of the respective sectors by using the sum of the respective sizes of the subcarriers corresponding to the sectors.

10. The device of claim 7, wherein the phase offset compensator multiplies the autocorrelation value of the respective signals of the preamble sequence by the phase offset of the respective signals.

11. The device of claim 7, further comprising
an analog/digital converter for converting the downlink frame signal into a digital signal and transmitting the digital signal to the frequency offset estimator.

12. The device of claim 7, wherein subcarriers of the preamble sequence of each sector are arranged at regular intervals in the frequency domain.

13. A recording medium of a communication device for recording a program for realizing a method for estimating a frequency offset in a communication system in which a plurality of sectors are allocated to a cell, the method comprising:
extracting a preamble sequence from a downlink frame signal;
estimating a phase offset of the sector to which the subscriber station belongs from among the sectors by using the preamble sequence;
calculating an autocorrelation value for the respective signals of the preamble sequence;
compensating the autocorrelation value by using the phase offset, and
estimating a frequency offset from the phase offset compensated autocorrelation value,
wherein estimating of the phase offset comprises:
converting the preamble sequence into a preamble signal in the frequency domain:
extracting subcarriers of respective sectors from the preamble signal;
calculating sizes of the subcarriers of the respective sectors;
calculating received power of the respective sectors from the sizes of the subcarriers of the sectors;
comparing received power of the respective sectors and detecting a sector to which the subscriber station belongs from among the sectors; and
determining the phase offset of the detected sector, and
wherein the phase offset is determined by:

$$\exp\left(-j2\pi\frac{n\times s}{N}\right),$$

where N indicates a number of preamble sequences, n indicates an index of the preamble sequence in a time domain, and x indicates a number for shifting of the detected sector with respect to the reference sector from among the sectors.

* * * * *